(No Model.)
J. W. TUGGLE.
SEED PLANTER.
No. 492,479. Patented Feb. 28, 1893.
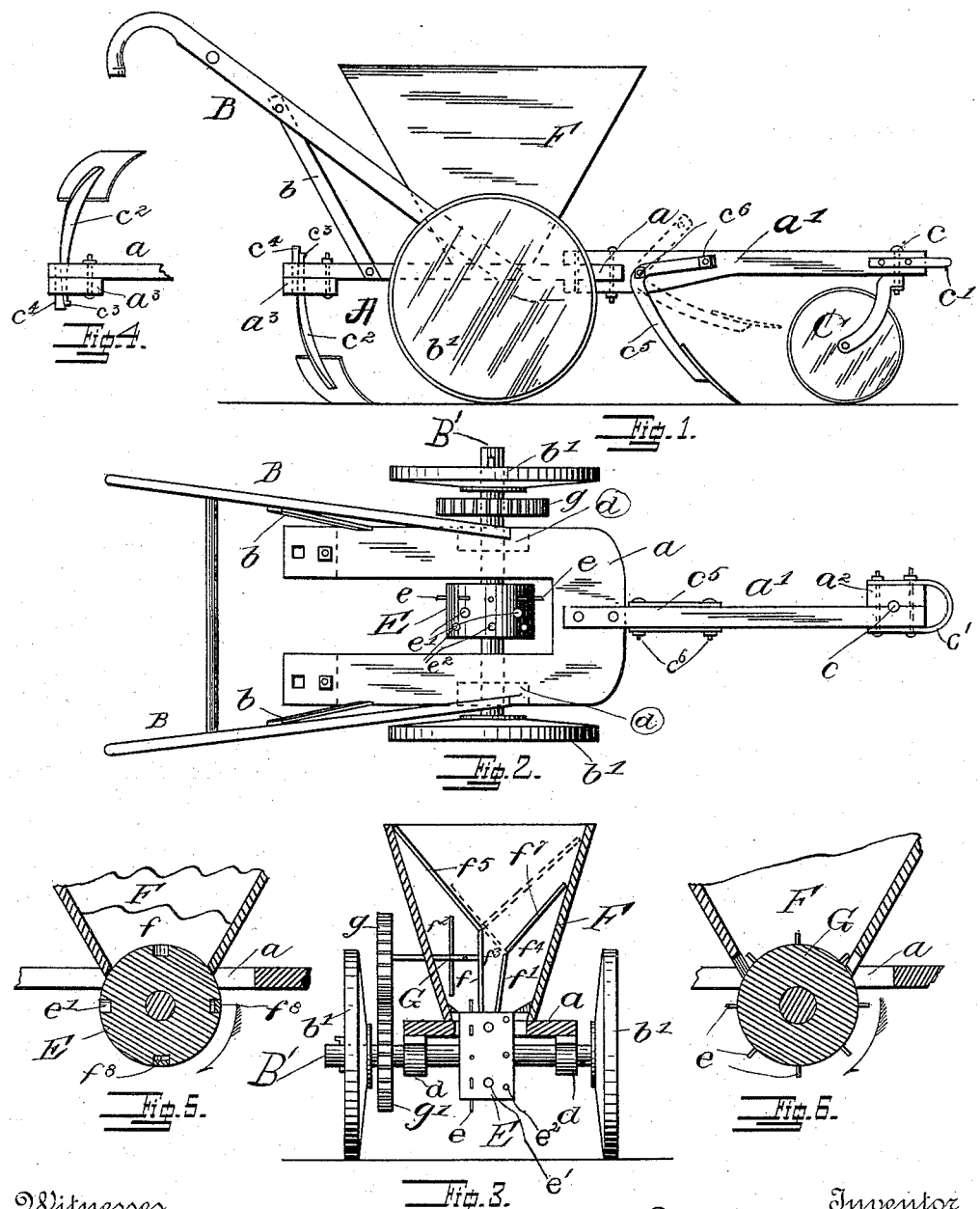

UNITED STATES PATENT OFFICE.

JOHN W. TUGGLE, OF SHELTONVILLE, GEORGIA.

SEED-PLANTER.

SPECIFICATION forming part of Letters Patent No. 492,479, dated February 28, 1893.

Application filed September 26, 1892. Serial No. 446,957. (No model.)

*To all whom it may concern:*

Be it known that I, JOHN W. TUGGLE, a citizen of the United States, and a resident of Sheltonville, in the county of Forsyth and State of Georgia, have made certain new and useful Improvements in Seed-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invenion relates as before stated to seed planters, and it has particular reference to a machine which shall be capable of planting several kinds of seed, whereby it is rendered possible to do all the seeding on a farm with one machine and without shifting parts, as is commonly the case with seeders.

The invention consists of an improved hopper, delivery wheel and other details, the whole of which will be hereinafter fully specified.

In the accompanying drawings, Figure 1 is a side elevation of the device showing the arrangement thereof from an exterior standpoint. Fig. 2 is a plan thereof, showing the form of the frame, the hopper being removed to show a plan of the distributing wheel. Fig. 3 is a vertical cross section through the hopper and frame, showing the interior arrangement of the hopper and the relative position thereto of the distributing wheel, also the cotton-seed agitator and means for causing same to revolve. Fig. 4 is a detail of the covering plow and its standard showing it reversed as it would be when going to or from the field. Fig. 5 is a detail in cross-sectional view of the distributing wheel, the section being taken through the center of the corn planting apertures therein, and two of said apertures being closed, thereby preventing their working. Fig. 6 is a like view of the distributing wheel cut at the cotton delivering pins, also showing the arrangement of the hopper at that point.

In the figures, like reference characters are employed in the designation of corresponding elements of construction in all the views.

A is the frame, which is composed of a U-shaped piece $a$ in the curve of which is secured the forwardly projecting beam $a'$, and about midway thereof the handles B are secured, braces $b$ preserving the proper angle thereof, relatively to said frame. A block $a^2$ is secured to the side of the forward end of the beam $a'$, and a vertical hole bored, half in the beam and half in the block so the strain will be divided equally between the two, and the shank $c$ of the caster wheel C is inserted so as to revolve freely therein. A clevis $c'$ is bolted as shown to this block and the beam. Blocks $a^3$ are secured to the under side of the back ends of the frame $a$ and a hole is cut through each, a square hole being preferable, as it will prevent the turning of the foot $c^2$ therein, which said foot is made with a square shank, having a head $c^3$ and being tapering, so that, when it is seated, a key or wedge $c^4$ may be driven beside it in the said hole and it will thereby be held firmly in place in the said frame. In Fig. 4 this foot is illustrated as reversed as in going to or from the field whereby it is prevented from engaging the ground in so doing. The foot or standard $c^5$ is secured to the beam by two bolts $c^6$ and by removing the forward one of these bolts, the said foot may be turned up free from the ground as is shown in Fig. 1 by broken lines. When all of the plows are thus removed from engagement with the ground the machine may be used as a conveyance for the seed or other article which it is desired to convey to or from the field.

Journaled in blocks $d$ on the under side of the part $a$ of the frame is a shaft B$'$, which revolves freely in its bearings, and carries thereon the wheels $b'$, one of which is fast to the shaft and consequently causes same to revolve with it, while the other wheel is loosely journaled on the said shaft, and does not turn it nor is it turned by it. Secured to the middle portion of said shaft between the bifurcations of the part $a$ of the frame, is a drum or cylinder E, which has along its left end a circumferentially arranged series of spikes $e$ projecting substantially radially therefrom, while at its other end is a like series of small recesses $e^2$, preferably round, and midway between the two rows of holes and spikes is arranged a circumferential row of larger holes $e'$ which operate as will be hereinafter fully specified.

The hopper F is set and if desired suitably secured by screws or otherwise upon the top side of the part $a$ of the frame, its inner sides about registering with the drum E, over which it sets. Partitions $f$ and $f'$ are secured therein in such a position as to separate said hopper into three compartments near its bottom, across the bottom of each of which compartments runs one of the series of spikes or holes, said series being lettered respectively $e$, $e'$ and $e^2$, and their correlative comparments being lettered in the same order $f^2$, $f^3$, and $f^4$. The front and back sides of the hopper are notched so as to allow the passage of the spikes, a bristle brush, or if desired, a piece of split leather, being employed to automatically close the notch for the ingress of the spikes to the compartment $f^2$. The upper section $f^5$ of the partition $f$ is hinged and movable on the lower section, as shown in Fig. 3, and thereby enlarging the compartment $f^2$ or $f^3$ at will, while the upper half $f^7$ of the partition $f'$ is also pivoted and by swinging as shown in Fig. 3, it will transfer the enlargement to the compartment $f^4$ if desired, as shown by the broken lines in Fig. 3. If it is desired to plant cotton the partition consisting of the parts $f$ and $f^5$ is arranged as shown in Fig. 3 by dotted lines (part $f^5$) and the hopper filled with cotton-seed, but if it be desired to plant corn the hopper is arranged as shown by the solid lines therein, and if it be desired to plant corn and peas together the compartment $f^4$ will be first filled with said peas and the parts afterward arranged as shown a small quantity of peas being only required to plant the same area as the corn will plant, the capacity of the said compartment being made slightly larger in the arrangement shown than would be the case otherwise. The adjustment of the output of the smooth seeds is regulated as shown in Fig. 5, that is, by inserting small disks $f^8$ of leather in the holes in the drum, which it is desired to stop from feeding seeds.

An agitator G in the compartment $f^2$ of the hopper is caused to revolve by gears $g$ and $g'$, the same being mounted on the agitator shaft and the shaft B', respectively. Cotton seed requires an agitator by reason of its lint, to prevent its arching over in the hopper.

Having thus described my invention, what I claim as new, and desire to secure by Letters Patent of the United States, is—

The combination in a seed-planter, of the U-shaped frame the beam secured thereto carrying a standard, a furrow-opener thereon, standards secured to the back end of the frame, curved blades thereon, a shaft journaled on the under side of said frame, ground wheels thereon, a drum secured on and revolving with said shaft, a circumferentially extending row of spikes set in said drum near one end, a row of recesses near the other end and a row of larger recesses intermediately arranged, a hopper seated on the frame over the said drum, partitions $f$ and $f'$ therein, the former being higher than the latter, said partitions dividing the hopper into three compartments each registering at its bottom with one of the rows of delivery devices, a leaf hinged to the upper edge of the partition $f$ and extending to the top of the hopper, a leaf hinged to the upper edge of the partition $f'$ of just sufficient length to overlap the aforesaid leaf, and an agitator mounted in the compartment correlative to the spikes in the drum, and revolved by gear connection with the shaft, all combined arranged and operating substantially as and for the purpose specified.

In testimony whereof I hereunto affix my signature in presence of two witnesses.

JOHN W. TUGGLE.

Witnesses:
RICHARD P. LESTER,
WM. R. OTWELL.